Feb. 1, 1938. E. H. LAND 2,106,752
FIELD DIVIDER
Filed Dec. 3, 1934 4 Sheets-Sheet 2
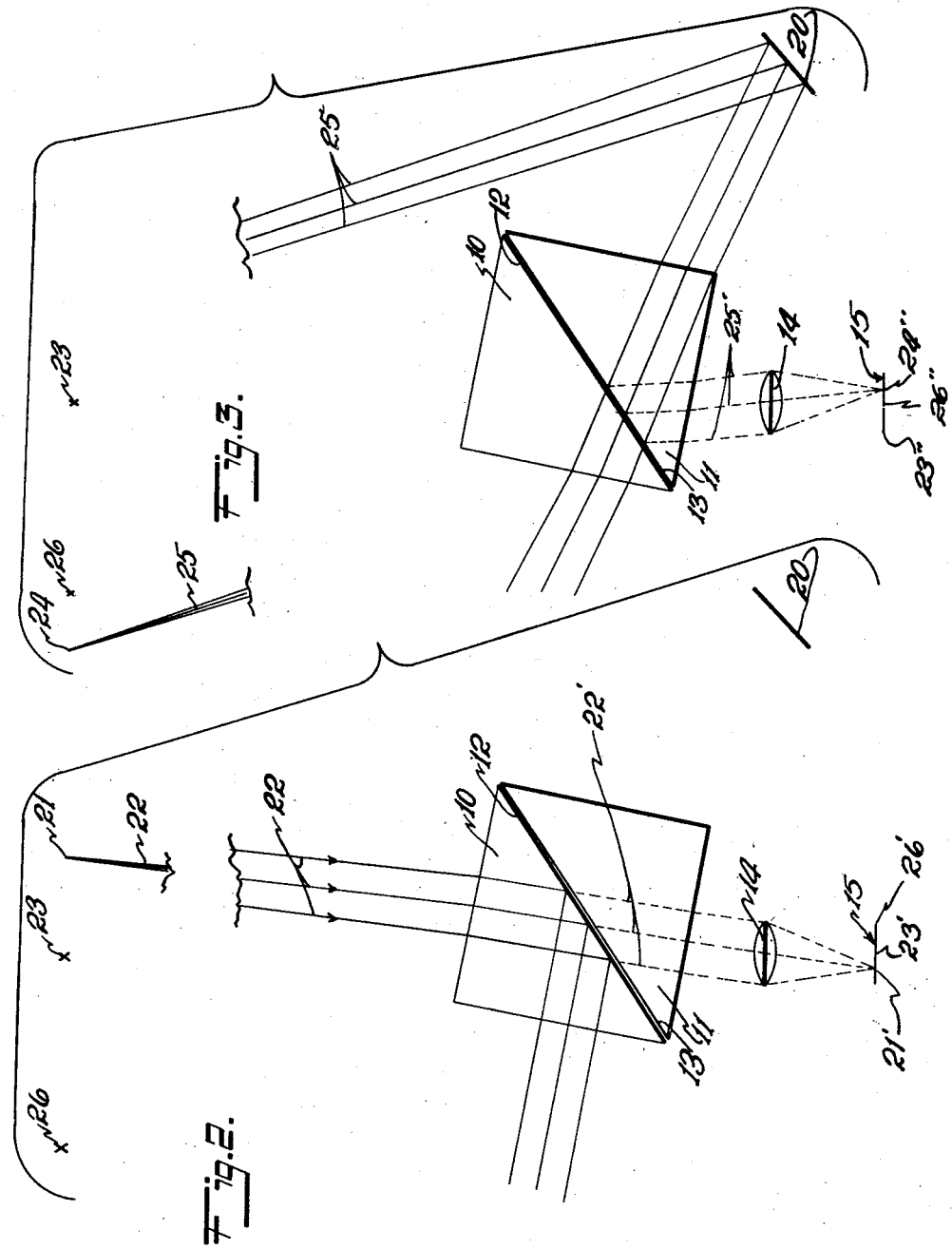

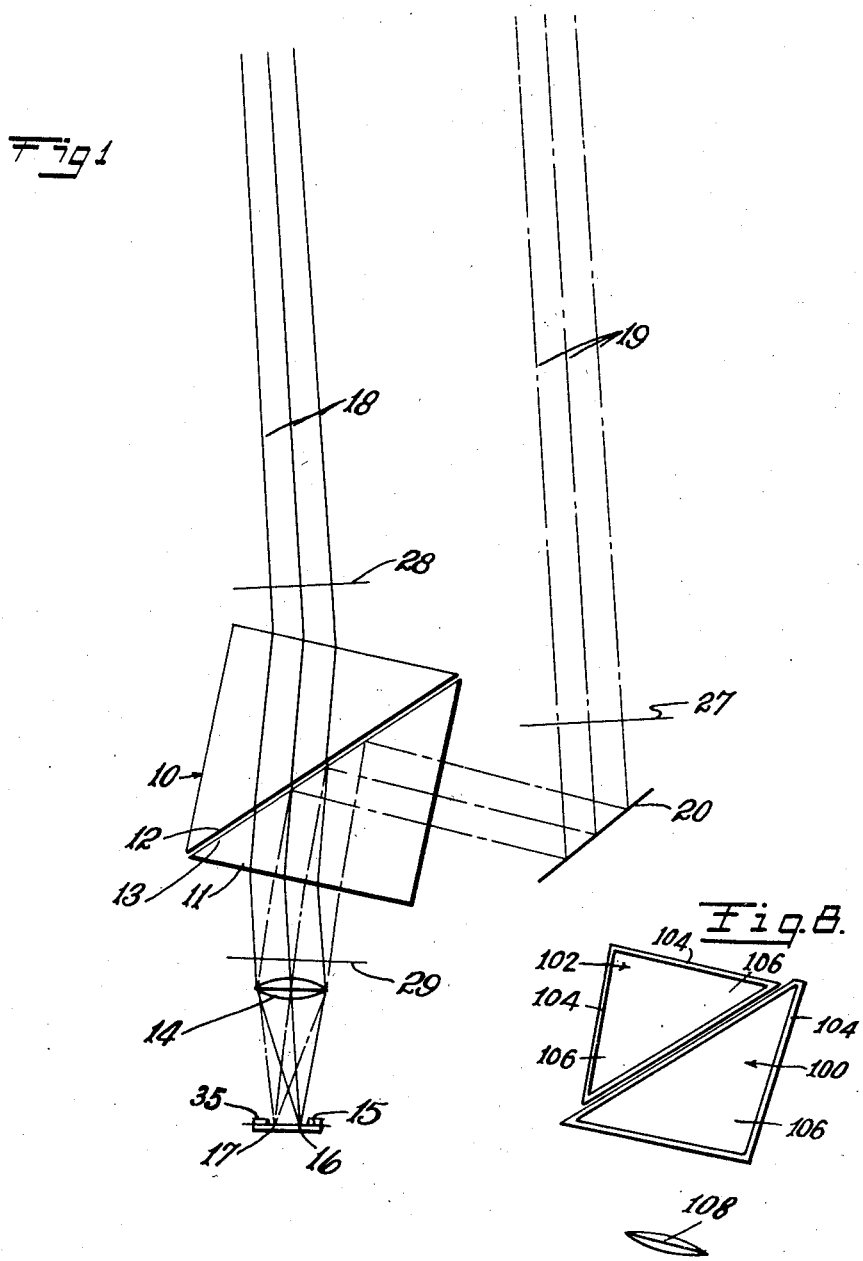

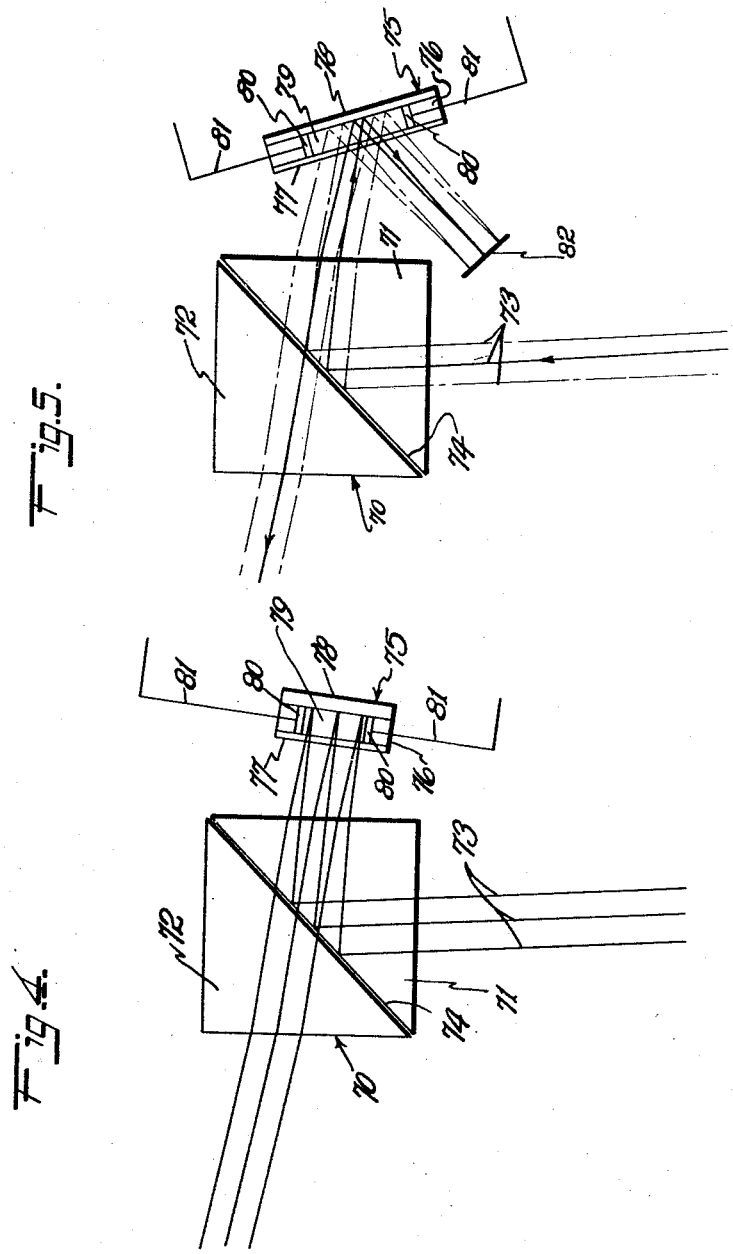

Feb. 1, 1938.  E. H. LAND  2,106,752
FIELD DIVIDER
Filed Dec. 3, 1934  4 Sheets-Sheet 4
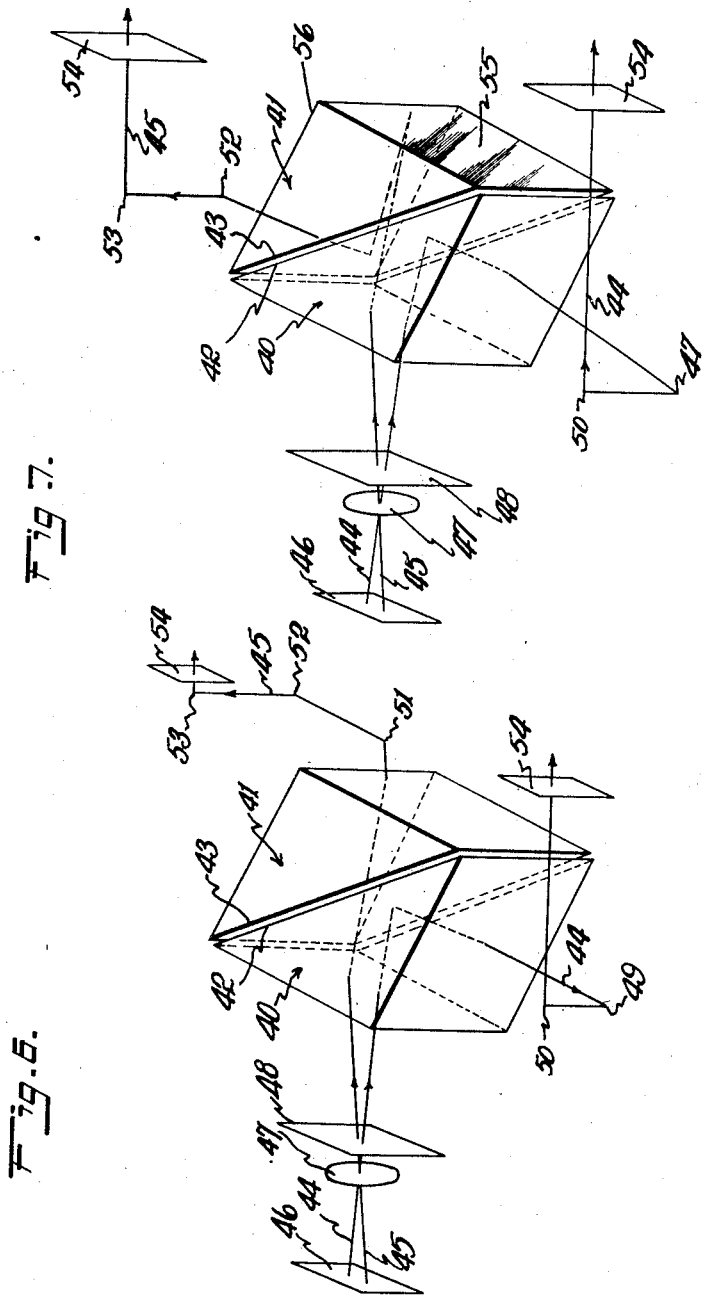
INVENTOR
Edwin H. Land
BY
Warfield & Brown
ATTORNEYS Patented Feb. 1, 1938

2,106,752

UNITED STATES PATENT OFFICE 2,106,752

FIELD DIVIDER

Edwin H. Land, Wellesley Farms, Mass., assignor to Sheet Polarizer Company, Inc., Union City, N. J., a corporation of New Jersey Application December 3, 1934, Serial No. 755,679

8 Claims. (Cl. 88—16.6)

This invention relates to new and improved optical systems, and more particularly to an improved beam-splitter or field-divider.

An object of the invention is to provide a device of the character described comprising a prism fuctioning to effect the desired result by reflection and refraction of transmitted light at a predetermined face thereof without substantial light loss.

A further object of the invention is to provide in connection with such apparatus a lens adapted to transmit over substantially all portions of a predetermined surface thereof both the reflected and refracted components transmitted by said prism.

A further object of the invention is to provide apparatus comprising in combination a beam-splitter and a reflecting surface, and such other elements as will permit the employment of said beam-splitter and said reflecting surface as an attachment for a camera or for a projector whereby said camera or projector may be adapted for stereoscopic purposes.

A still further object of the invention is to provide, in connection with the simple form of beam-splitter hereinafter described, suitable means whereby the conventional frame shape in motion picture photography may be retained.

A still further object of the invention is to provide a device of the character described which may be used with light polarizing elements in the projection of stereoscopic images, and which may be employed with suitable color filters in connection with color photography.

A still further object of the invention is to provide a method of forming stereoscopic images or of projecting such images, which comprises utilizing the same surface between transparent media of different refractive indices for reflecting light forming one of said stereoscopic images and for refracting light forming the other of said stereoscopic images.

A still further object is to provide such a method where the reflected and refracted light have substantially the same origin.

Other objects of the invention will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Figure 1 is a diagrammatic representation of a simple form of the device embodying the invention showing the paths taken by typical bundles of rays forming points in each of the stereoscopic images transmitted by the device;

Fig. 2 is a diagrammatic representation of the device shown in Fig. 1 illustrating the path taken by a bundle of rays from a point lying outside the desired field of the device;

Fig. 3 is a diagrammatic representation of the device shown in Fig. 1, showing the path taken by a bundle of rays from a point lying outside the field of the device, and it differs from Fig. 2 in that Fig. 3 is illustrative of the path taken by rays from a point on the opposite side of the field from that illustrated in Fig. 2;

Fig. 4 is a diagrammatic representation of a modification of the invention showing the simple prism structure of the invention used in connection with a light valve;

Fig. 5 is a further modification of the device shown in Fig. 4;

Fig. 6 is a diagrammatic representation of the paths taken by rays forming each of the stereoscopic images transmitted through the device when the device is equipped with means for preserving the standard frame shape now used in motion picture photography;

Fig. 7 is a diagrammatic representation of the paths taken by such beams in a modification of the structure shown diagrammatically in Fig. 6; and Fig. 8 is a diagrammatical representation of an embodiment of the invention employing liquid prisms.

Heretofore in taking and projecting stereoscopic pictures, a problem has been to provide an attachment for standard equipment which will convert standard cameras and projectors into forms adapted for stereoscopic use. A preferred form for the attachment would be one such that it could be affixed to the camera or to the projector between the lens and the object, or between the lens and the screen respectively, with no alteration of the camera or projector other than the provision of supporting means for the attachment.

The device should utilize the full lens aperture for each of the stereoscopic images in taking and in projecting. Furthermore it should be adapted for use in color photography without alteration of the standard color filter equipment, such as the sectional color filters employed in front of a lens. It should be adapted for use with any color photography process, such as those using the embossed film, bipack and tripack films, and other color-separation methods. It should also be compact.

In taking, the device should form a substantially straight and sharp line between the adjacent left and right eye pictures, and should accomplish this without the use of complicated or bulky vignetting shades. Each image should be formed without substantial light loss from the field.

In projection, the device should be adapted for use with polarizers.

It is desirable, though not essential, that the same device can be used as an attachment to convert both the taking and projecting apparatus into stereoscopic form. It is preferable that the device require no additional lenses, and particularly that it require no carefully matched or corrected lenses.

The device of this invention possesses all of the desirable qualities enumerated above.

In simple form the device comprises a pair of 45° prisms placed with their hypothenuses parallel, and with an air gap therebetween, the two prisms forming a cube which is placed directly in front of the lens. The material of these prisms is transparent to the radiation upon which the device is to operate and may ordinarily be glass. A reflecting surface, which may be a mirror or prism, is placed to one side of the cube and at a distance from it equal to the desired inter-ocular distance, and this reflecting surface is roughly parallel to the hypothenuses of the prisms.

The cube is so positioned that the hypothenuses lie at the critical angle to the axial rays emerging from or entering the lens.

Under these circumstances the rays traversing the boundary between adjacent images at a focal plane of the lens, for example at the film, will also traverse a nodal point of the lens and will impinge upon the hypothenusal face of the prism functioning as a dividing prism at an angle X to the normal to the said face such that cosec X equals approximately the ratio of the index of refraction of the prism functioning as the dividing prism to the index of refraction of the medium in the gap between the two prisms. Where air is the medium in the gap between two prisms, cosec X will equal approximately the index of refraction of the dividing prism. It will be understood, inasmuch as a basic object of the invention is to provide a device for use in stereoscopic picture taking and projection, that while a preferred form of the invention contemplates the positioning of the prism unit so that the hypothenuse of the dividing prism lies at the critical angle as defined to the axial rays, this condition may be modified where the axial rays do not coincide with the rays forming the boundary between adjacent images at the focal plane of the lens. Under such circumstances the hypothenusal face of the dividing prism should preferably be so positioned as to intersect rays traversing the boundary line between the two images and a nodal point of the lens at the effective angle defined above, even though those rays may not coincide absolutely with the axial rays. This latter situation might arise, for example, if it is found desirable to employ a sound track and to utilize less than the entire film width for the reproduction of the stereoscopic images. In the claims the condition outlined above will be defined as a condition wherein the light-dividing face of the light-dividing unit is positioned at the critical angle of reflection to the axis of the objective lens.

The reflecting surface is preferably adjustably positioned to permit proper converging of the left and right eye beams in projecting, and in taking to secure left and right eye images of the same field, irrespective of the distance of the field from the lens.

In Fig. 1 is shown a diagrammatic representation of a simple form of the invention used either in connection with taking or projecting. As shown in Fig. 1, the device comprises two 45° prisms 10 and 11 positioned with their hypothenuses 12 and 13 adjacent, but with an air-gap therebetween. The air or other material in the gap has an index of refraction differing from the index of refraction of the material of the prisms 10 and 11. The gap, or more accurately the material in the gap, is one of the elements of the device. The cube formed by the two prisms is positioned in front of the lens 14 in such a way that the hypothenuses 12 and 13 lie at the critical angle to the axial rays traversing the lens. Two prisms are employed, among other reasons to avoid chromatic and other aberrations. 15 represents a film, held and positioned within means providing a film gate 35 and 16 and 17 represent points on the film lying on either side of that line on the film which in projection gives rise to the axial rays. 16 may be assumed to be any point in the left eye image, and 17 may be assumed to be any point in the right eye image.

18 will be deemed representative of the bundle of rays originating from or going to the point 16, and 19 representative of the bundle of rays originating from or going to the point 17. For the sake of clarity the bundle of rays 18 is shown in solid lines and the bundle of rays 19 is shown in broken lines.

20 represents a reflecting surface which may be, for example, either a mirror or a reflecting prism, and which is provided with means, not shown, adapted to permit rotation of the element 20 for adjustment so that in taking each half of the film is exposed to the same field and in projecting the two stereoscopic pictures may be properly superimposed on the viewing screen.

Fig. 2 is a diagrammatic representation of one phase of the operation of the beam-splitter in connection with taking stereoscopic pictures. It shows how the beam-splitter acts to prevent light which enters the left eye orifice from falling upon that portion of the film which receives the right eye image of the field. In the drawings, 21 represents any point which would lie in the field of the camera if the beam-splitter were not employed but which is outside the field when the beam-splitter is employed. When the beam-splitter is employed, the area on which the image of this point would otherwise fall must be reserved for the right eye image, since by this process the stereoscopic images are formed side-by-side on an area previously used for the formation of a single image. Hence all light from the point 21 which enters through the left eye orifice must be diverted from its normal path and kept from reaching the lens. This is accomplished when devices embodying this invention are employed. 22 represents the bundle of rays from the point 21. These rays enter the prism 10 at such an angle that they are totally internally reflected from the hypothenuse 12 in the manner shown, and thus prevented from reaching the lens 14. In Fig. 2 the dotted lines 22' are illustrative of the path which the bundle of rays would take if they were not internally reflected at the face 12 of the prism 10 of the beam-splitter. Under such circumstances the rays from the point 21 would have formed an image 21' on the film 15 which would lie in that portion of the film reserved for the right eye image.

In Fig. 2 the points 23, 26 are representative of the limits of the field which lies in the left eye stereoscopic image, 23', 26', when the beam-splitter is employed to produce stereoscopic right eye and left eye images.

Fig. 3 is a diagrammatic representation of another phase of the operation of the beam-splitter in connection with taking stereoscopic pictures. It shows how the beam-splitter acts to prevent light which enters the right eye orifice from falling upon that portion of the film which receives the left eye image of the field. In the drawings, 24 represents a point in the field of the right eye orifice which would be reproduced on the film if we assume that the hypothenuse 13 of the prism 11 be a reflector without a critical angle at which it ceases to reflect (as for example a silvered surface), which is not in fact the case.

In the formation of side-by-side stereoscopic images, that portion of the film which is reserved for the left eye image must receive only light entering the camera through the left eye orifice. Hence all light from the point 24 which enters through the right eye orifice must be prevented from reaching the lens. When devices embodying this invention are employed, this is accomplished, save for a small amount of air-glass reflection (not total reflection) which is so slight as generally to be unobjectionable.

25 represents the bundle of rays from the point 24. These rays strike the reflecting surface 20 and are reflected therefrom through the prism 11 at such an angle that they are refracted through the surface 13 and are not totally reflected therefrom. The dotted lines 25' are illustrative of the path which the bundle of rays 25 would take if the surface 13 were a silvered reflecting surface. Under such circumstances rays from the point 24 would have formed an image 24'' on the film 15 which would lie in that portion of the film reserved for the left eye image. In the device of the invention, however, the bundle of rays 25 never reaches the lens or the film.

In Fig. 3 the points 23 and 26 are representative of the limits of the field which lies in the right eye stereoscopic image 23'', 26'' when the beam-splitter is employed to produce stereoscopic right eye and left eye images.

In both Figs. 2 and 3 bundles of rays have been selected from points, as for example 21 and 24, forming the dividing line or closely adjacent the dividing line between the right and left eye images on the film, as the rays from these points are typical of the rays from points for which the vignetting problem might be expected to be acute.

In connection with the projection of stereoscopic pictures it is desirable to polarize the right eye and left eye images differently so that they may be separated by suitable analyzers or viewing glasses, and to this end polarizers 27, 28 may be employed. As shown in Fig. 1, they are both positioned to transmit the respective right eye and left eye rays after the rays leave the beam-splitter. It will be obvious that the polarizing elements may be positioned at other places in the combination. For example the polarizing element 27 may be positioned against the right hand face of the prism 11, provided it is properly oriented. It may be possible also to use a single polarizing element positioned, for example, between the light source and the prism 11 in such a way as to completely intersect all of the rays. With such a polarizing device suitable double refracting elements may be employed, as for example a quarter wave plate at 28 to circularly polarize the left eye image beams, and another element at 27 to insure circular polarization of the right eye image beams. It should be observed that a high degree of ellipticity can be introduced by the reflections from faces 13 and 20 if the polarizing element is properly oriented, so that the element at 27 may have other than a quarter wave retardation. It should be noted also that the element at 28 should be so positioned as to cause circular polarization in an opposite direction in the left eye images from that obtained in the right eye images.

Where the device is used for color photography in connection with an embossed film, a sectional color filter 29 of the conventional type may be employed and placed in the conventional manner.

Somewhat better results have been obtained where the beam-splitter of this invention is employed in taking stereoscopic color pictures with film on which the embossed lenses run horizontally than when they run vertically.

The device of this invention is adapted to form stereoscopic images with a fine line therebetween. The right eye image closely abuts against the left eye image, and neither image blurs over into the other. If the images are formed in monochromatic light, and if the object photographed is at a great distance from the lens, the two stereoscopic images may merge into each other with an almost imperceptible boundary line between them. Where, however, white light is employed, the hypothenuses of the prisms cannot be positioned at the critical angle for all the wave lengths of the light coming from a single point, so that the dividing line will be in a slightly different place for one wave length from what it is for another wave length, resulting in a very slight broadening of the central line between the two images on the developed film. The use of the collimating lenses is ordinarily unnecessary, as in no event is the central band or line large enough to become annoying. When the stereoscopic pictures are projected the band or line of the film dividing them appears at one side of the superimposed projected images, and may be projected off to the side of the viewing screen, so as to be invisible to an observer.

The prism structure of the device already described may be employed in other ways than in the taking or projecting of stereoscopic pictures. For example, in Figs. 4 and 5, two applications of the prism device are shown in connection with light valves. In Fig. 4 a structure is shown where by means of the prism structure described a beam may be transmitted twice through a light valve under conditions such that the incident and reflected beams are substantially parallel at the valve, and in Fig. 5 a similar structure is shown save that a supplemental reflecting surface is provided so that the beam may traverse the valve four times under conditions such that the first incident and finally reflected beams are substantially parallel.

With reference to Fig. 4, 71 and 72 are the two 45° prisms. 73 represents a bundle of rays forming an incident beam which strikes the hypothenuse 74 of the prism 71 at such an angle as to be totally internally reflected. 75 represents generally a light valve, for example, a light valve of the type disclosed in the issued patents to Land Nos. 1,955,923 and 1,963,496, comprising generally a suspension of light-reflecting or light-absorbing particles in a light-transmitting medium, and means to impress upon the particles an electrically controlled potential whereby the particles are caused to orient within the suspension, thus altering the total effective surface area presented by the particles to a transmitted beam of light.

In the drawings, 76 represents the container, 77 the transparent front wall of the valve, 78 a reflecting rear wall, 79 the suspension in the valve, 80 the electrodes, and 81 the feed-in wires. The beam 73, after leaving the prism 71, traverses the suspension in the valve, strikes the reflecting surface 78, again traverses the suspension in the valve, and may be redirected through the prism 71. If the incident and reflected beams from the valve are merged, but at such angles to each other that the incident beam is totally reflected from the surface 74 of the prism 71, while the reflected beam strikes that surface at such an angle that it is refracted therethrough, then the device may operate to separate substantially parallel beams, and the light valve may accordingly be operated under conditions where the incident and reflected beams must be nearly parallel. The valve may be positioned closely adjacent the prism structure. The second prism 72 functions to avoid distortion and prismatic deviation of the beam 73.

In Fig. 5 a reflecting surface 82 is shown positioned near the valve 75, whereby the beam may be passed four times through the suspension in the valve, and the functions of the valve thus augmented.

Structures such as are shown in Figs. 4 and 5 are intended to be illustrative of many similar optical combinations in which it is desirable to sharply separate substantially parallel components of a beam without decreasing its intensity.

It is conventional in moving picture work, although not in still photography, to use a frame that is wider than it is high. In the simple field dividing stereoscopic attachment described above, the frame shape is changed to one that is higher than it is wide. In certain cases it is desirable to be able to obtain the stereoscopic effect yet retaining the more conventionally shaped frame. One of the ways of accomplishing this is by using the reflecting system shown diagrammatically in Fig. 6, a modification of which is shown in Fig. 7. This system retains the fundamental field dividing principle of the simpler device, but causes each of the beams to undergo in succession three reflections in such a way that a 90° rotation of the image is produced. The first reflection of one of the beams is the reflection at the hypothenuse of the prisms of the simple field divider, which is responsible for the separation of the two beams.

Fig. 6 is a diagrammatic view in perspective of a reflection system of the type described, and Fig. 7 is a similar view of a modification of the system shown in Fig. 6. In these figures, 40 and 41 represent the 45° prisms forming the cube of the simple field divider shown, for example, in Fig. 1, 42 represents the hypothenuse of the prism 40, and 43 represents the hypothenuse of the prism 41. These hypothenuses are separated, as shown, by a small air-gap. 44 is representative of rays forming the right eye stereoscopic image, and 45 is representative of rays forming the left eye stereoscopic image.

Tracing the path taken in projection by the rays 44, and referring to Fig. 6, for example, the right eye stereoscopic image is impressed on these rays at the film 46. The rays then pass through the lens 47, through the color filter 48, and enter the prism 40. They traverse the prism and are totally internally reflected at the hypothenuse 42 thereof. They then continue to traverse the prism, and after leaving it are vertically reflected, as for example at 49. The rays are then again reflected, as for example at 50, so that as they leave the optical system they will be directed to a viewing screen, not shown, on which they will impinge.

Tracing now the path taken by the rays 45 which form the left eye stereoscopic image, after leaving the film 46 they pass through the lens 47, the color filter 48, and traverse the prism 40. They impinge upon the hypothenuse 42 of that prism at such an angle as to be refracted therethrough without being totally internally reflected. They then traverse the air-gap between the two prisms and enter the prism 41, which acts as an achromatizing prism. The rays then leave this prism and are horizontally reflected, as at 51. They are then vertically reflected as at 52, and finally reflected as at 53 in such a way that as they leave the optical system they are directed toward the viewing screen, on which they impinge in superimposed relation with the rays 44. Both the rays 44 and 45 may traverse suitable polarizing elements 54.

In the modification shown diagrammatically in Fig. 7, the rays 44 forming the right eye stereoscopic image traverse precisely the same path as did the same bundle of rays in Fig. 6. The rays 45, however, are caused to traverse a different path. In this modification the face 55 of the prism 41 is silvered to form a reflecting surface. The rays 45, after traversing the prism 40 and the prism 41, strike this face and are totally internally reflected. The rays continue to traverse the prism 41 and impinge upon the hypothenuse 43 thereof at such an angle as to be totally internally reflected therefrom. The rays continue to traverse the prism 41 and leave it by the unsilvered face 56. They are then vertically reflected as at 52 and again reflected as at 53 in the manner already described in connection with the description of Fig. 6. Means for effecting the required reflections are not shown, as it will be obvious to those skilled in the art how this may be accomplished. It is enough to say that a compact structure may be formed which will perform the functions described.

Although the descriptions of Figs. 6 and 7 have been in connection with the projection of stereoscopic images, it will be obvious that the systems there diagrammatically shown may be employed in the taking of stereoscopic images.

It should be noted that the system of Fig. 7 introduces an additional reflection in the beams carrying the left eye stereoscopic image which should be considered in the selection of the systems employed in taking and projection if the same device is not employed in both.

The operation of the simple form of the device in taking pictures is as follows, reference being had particularly to Figs. 1, 2 and 3: It will be understood that points 23, 26 represent the limits of the desired field, which is half the normal field of the camera without the field divider. Light from any spot on the field, i. e., from any point between the points 23 and 26, will enter the left eye orifice in the manner illustrated in Fig. 1 by the bundle of rays 18, and will traverse the prisms 10 and 11 without being internally reflected in the manner shown in Fig. 1, forming an image after passing through the lens 14 on the right-hand portion of the film 15. It should be observed that the whole lens stop can be used in connection with the light coming from any point in the field. Light from points in the field entering the right eye orifice of the camera strikes the reflecting surface 20, as does the bundle of rays 19 in Fig. 1, is reflected therefrom through the prism 11, and is internally totally reflected by the hypothenuse of that prism. It then passes through the lens and forms an image on the left half of the film. It is to be noted that here again the entire lens stop may be employed. Light coming from points to the right of the field, i. e., from points such as 21, and entering the left eye orifice is diverted by the field divider in the manner shown in Fig. 2, so that it does not reach the lens or the film. It will be obvious that such light is outside the field of the right eye orifice, and hence under no circumstances would form any image on the film by entering that orifice. Light to the left of the point 26, as for example light from a point 24 which is outside the field of the left eye orifice, and which therefore would form no image after passing through that orifice, is prevented from forming any image after traversing the right eye orifice in the manner shown in Fig. 3, where it appears that such light is refracted through the face 13 of the prism 11, and is not internally reflected and does not reach the lens or film.

The operation of the device in projection has already been explained in connection with the description of Fig. 1, which shows how the beams carrying the side-by-side stereoscopic images are divided so that they may be separately polarized and later superimposed on the viewing screen. It should be pointed out that in projection the prism 10 acts as an achromatizing prism, and also acts to correct any prismatic magnification or minification which may have been effected by the prism 11.

It will be understood that the beam-splitter of this invention is useful for many purposes which have not herein been described. For example, the device has been described in connection with the taking and projection of stereoscopic images of the same field. It will be obvious that side-by-side images of adjacent or even of separated fields may be secured by adjusting the reflecting element 20 to cover some other field than that covered by the "left eye" orifice. These images will always be secured without objectionable overlap or blur.

It will be obvious that many other forms of the invention may be employed utilizing the principle of beam-separation by refraction and internal reflection here disclosed. For example, liquid prisms may be employed, as shown for example in Fig 8, where 100, 102 represent generally the prisms of the prism unit, each prism comprising a transparent vessel 104 containing liquid 106, the walls of the vessels being preferably of uniform thickness. Such a prism unit may be positioned in the manner shown in front of an objective 108 and will function like the device shown in Fig. 1, for example. So also what has been described above as an air-gap between the two prisms may in fact be some cementing or other material having the proper index of refraction. The total internal reflection may also occur when the light goes from the medium between the prisms to a prism, rather than when the light goes from a prism to the medium between the prisms, as shown and described above, provided, however, that the medium between the prisms has a higher index of refraction than the prisms.

It will also be apparent that while right and left eye images have been described as each comprising approximately half of the film frame, it may be desirable to divide the field differently for some purposes, in which case a suitable adjustment of the device will effect the desired field division.

When the device is used in connection with the projection of stereoscopic pictures, that beam which is refracted through the beam-splitter, i. e., the beam carrying the left eye image in the device shown for example in Fig. 1, is found to be fairly well polarized by refraction. It is therefore desirable to arrange the polarizing elements used in connection with projection so as to take advantage of this normal polarization of the refracted beam. This should preferably be done even though the relatively slight air-glass reflection component may thereby be transmitted with the reflected beam, i. e., with the beam carrying the right eye image in Fig. 1.

When the device is employed with a translucent screen in the projection of stereoscopic images, reversing prisms should be employed either between the lens and the beam-splitter or on each of the separated beams, or else the device should be modified by positioning it with respect to the translucent screen in such a way that the reflected beam, i. e., the beam carrying the right eye image in Fig. 1, is not again reflected after its reflection from the hypothenuse of the first prism. When the device is so employed the reflecting element 20 should be positioned to intersect the refracted beam, i. e., the beam carrying the left eye image in Fig. 1, so that this beam will be reflected in such a manner as to be superimposed upon the other beam at the translucent screen.

Since certain changes in carrying out the above method and in the constructions set forth, which embody the invention may be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent, is:

1. A multiple image optical system comprising, in combination, a prism unit having two prisms having their hypothenusal faces parallel and separated by a slight air space, an objective lens adjacent the prism unit, the axis of said objective meeting the normal to the hypothenusal faces of said prisms at an effective angle, the cosecant of which is substantially the index of refraction of the material forming the prisms, and reflecting means facing the plane of the said hypothenusal faces of the prisms, the focal planes of light from the reflector being substantially the same as the focal planes of the light transmitted by both the prisms of the prism unit.

2. A multiple image optical system comprising, in combination, a prism unit having two right-angle prisms having their hypothenusal faces parallel and separated by a slight air space, an objective lens adjacent the prism unit, the axis of said objective meeting the normal to the hypothenusal faces of said prisms at an effective angle, the cosecant of which is the index of refraction of the material forming the prisms, and reflecting means facing the hypothenusal face of the prism adjacent the objective, the focal planes of light from the reflector being substantially the same as the focal planes of the light transmitted by both prisms of the prism unit.

3. A projector comprising a film gate, an objective adapted to transmit light rays from a plurality of images in the film gate, a prism before the objective and having a face adjacent a medium having an index of refraction differing from the index of refraction of said prism, the normal to said face meeting, at an angle X, rays traversing the boundary between said multiple images in said film gate and traversing a nodal point of said objective, where cosec X equals substantially the ratio of the index of refraction of the prism to the index of refraction of the medium, and a reflector for directing light from the prism to a focal plane of said objective, said objective being positioned between said film gate and said prism, the focal planes of light from the reflector being substantially the same as the focal planes of the light transmitted by both the prisms of the prism unit.

4. A projector comprising a film gate, an objective positioned to transmit light rays from a plurality of images within said film gate, a prism unit positioned on that side of the objective away from said film gate, said unit comprising two prisms with their hypothenusal faces adjacent each other and separated by an air space, the normal to said faces meeting, at an angle X, rays traversing the boundary between said images in said film gate and traversing a nodal point of said objective, where cosec X equals substantially the index of refraction of the medium of said prisms, and a reflector adjacent the prism unit and facing said hypothenusal faces and adapted to direct light from the prism unit to a focal plane of said objective.

5. A multiple image optical system comprising, in combination, a light-dividing unit and an objective, said unit having a plane transparent surface at the critical angle of reflection to the axis of said objective to provide a transmitted and a reflected beam, and reflecting means adjacent the transparent surface for providing common focal planes for the said beams.

6. A multiple image optical system comprising, in combination, a light-dividing unit, an objective, and a film gate, said unit having a plane transparent surface meeting rays passing through the boundary between multiple images in said film gate and through a nodal point of said lens at the critical angle of reflection to said rays to provide a transmitted and a reflected beam, and reflecting means adjacent the transparent surface for providing common focal planes for the said beams.

7. A multiple image optical system comprising, in combination, a prism unit and an objective, said unit having a plane transparent surface at the critical angle of reflection to the axis of said objective to provide a transmitted and a reflected beam, and reflecting means facing said transparent surface and adjacent said surface for providing common focal planes for said beams.

8. A camera comprising, in combination, an objective, means positioned behind the objective for holding a light-sensitive film in substantially one of the focal planes of said objective, a light-dividing unit positioned in front of said objective, said unit having a plane transparent surface at the critical angle of reflection to the axis of said objective to provide a transmitted and a reflected beam, and reflecting means adjacent said transparent surface for providing substantially common focal planes for the said beams.

EDWIN H. LAND.